US008094958B2

(12) United States Patent
Park et al.

(10) Patent No.: US 8,094,958 B2
(45) Date of Patent: Jan. 10, 2012

(54) APPARATUS AND METHOD FOR SHARPENING BLURRED ENLARGED IMAGE

(75) Inventors: Sang Wook Park, Daejeon (KR); Chang Joon Park, Daejeon (KR); In Ho Lee, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1111 days.

(21) Appl. No.: 11/923,750

(22) Filed: Oct. 25, 2007

(65) Prior Publication Data
US 2008/0112640 A1 May 15, 2008

(30) Foreign Application Priority Data

Nov. 9, 2006 (KR) .......................... 10-2006-0110495
Sep. 10, 2007 (KR) .......................... 10-2007-0091683

(51) Int. Cl.
  *G06K 9/40* (2006.01)
(52) U.S. Cl. ................ 382/254; 382/263; 382/266
(58) Field of Classification Search ................. 382/254, 382/263, 266, 255, 268, 269
See application file for complete search history.

(56) References Cited

U.S. PATENT DOCUMENTS

| 6,330,372 | B1* | 12/2001 | Goldstein et al. | 382/266 |
| 6,535,632 | B1* | 3/2003 | Park et al. | 382/164 |
| 7,110,602 | B2* | 9/2006 | Krause | 382/199 |
| 7,176,983 | B2* | 2/2007 | Chiang et al. | 348/630 |
| 7,440,614 | B2* | 10/2008 | Ida et al. | 382/173 |
| 2005/0012866 | A1* | 1/2005 | Chiang et al. | 348/625 |

FOREIGN PATENT DOCUMENTS

| KR | 2002-0041812 A | 6/2002 |
| KR | 1020050034051 | 4/2005 |
| KR | 1020050107284 | 11/2005 |
| WO | 01/20551 A1 | 3/2001 |

OTHER PUBLICATIONS

Jan Allebach et al; "Edge-Directed Interpolation"; IEEE, 1996.

* cited by examiner

*Primary Examiner* — Stephen Koziol
(74) *Attorney, Agent, or Firm* — Ladas & Parry LLP

(57) ABSTRACT

Provided is an apparatus for sharpening a blurred enlarged image, including a digital image output unit for outputting a digital image input through a digital image input unit. The apparatus includes a digital image processing unit for calculating a primary edge direction of the digital image input through the digital image unit to perform enlarging and edge sharpening on the input digital image. Accordingly, blurring is removed from the enlarged image without ringing or an artifact using an adaptive edge sharpening method, so that the enlarged image can be sharpened.

16 Claims, 4 Drawing Sheets

FIG. 5

|  |  |  |
|---|---|---|
| Y(0,0) | Y(0,1) | Y(0,2) |
| Y(1,0) | Y(1,1) | Y(1,2) |
| Y(2,0) | Y(2,1) | Y(2,2) |

FIG. 6a

|  | h( ,0) | h( ,1) | h( ,2) |
|---|---|---|---|
| h(0, ) | 1 | 1 | 1 |
| h(1, ) | 0 | 0 | 0 |
| h(2, ) | -1 | -1 | -1 |

FIG. 6b

|  | h( ,0) | h( ,1) | h( ,2) |
|---|---|---|---|
| h(0, ) | 1 | 0 | -1 |
| h(1, ) | 1 | 0 | -1 |
| h(2, ) | 1 | 0 | -1 |

FIG. 6c

|        | h( ,0) | h( ,1) | h( ,2) |
|--------|--------|--------|--------|
| h(0, ) | 1      | 1      | 0      |
| h(1, ) | 1      | 0      | -1     |
| h(2, ) | 0      | -1     | -1     |

FIG. 6d

|        | h( ,0) | h( ,1) | h( ,2) |
|--------|--------|--------|--------|
| h(0, ) | 0      | 1      | 1      |
| h(1, ) | -1     | 0      | 1      |
| h(2, ) | -1     | -1     | 0      |

FIG. 7

|        | h( ,0) | h( ,1) | h( ,2) |
|--------|--------|--------|--------|
| h(0, ) | -0.25  | -0.25  | -0.25  |
| h(1, ) | -0.25  | 1      | -0.25  |
| h(2, ) | -0.25  | -0.25  | -0.25  |

APPARATUS AND METHOD FOR SHARPENING BLURRED ENLARGED IMAGE

BACKGROUND OF THE INVENTION

1. Field of the Invention

The present invention relates to an apparatus and a method for sharpening an edge of a blurred enlarged image, that can be applicable even to a high definition digital image of more than 2 k (horizontal resolution of 2000 pixels in an image), and more particularly, to an apparatus and a method for sharpening a blurred enlarged image by performing high-pass filtering the edge of an enlarged digital image adaptively without ringing or artifact to obtain a sharp image using a digital image processing technique.

2. Description of the Related Art

The present invention has been derived from a research conducted as a part of information technology (IT) new growth power core technology development business by Ministry of Information and Communication, Republic of Korea, and Institute for Information Technology Advancement (Project management No.: 2005-S-003-02, Project title: real-picture level digital image contents producing software).

For methods for sharpening an edge in a still image or a moving image, there are many Korea patent applications including Korea patent application Nos. 10-2003-0069837 and 10-2002-7003343. In the methods for sharpening an edge proposed by the above Korea patent applications, it is judged using a predetermined critical value set in advance whether to perform sharpening on an edge region. In the case where a user performs the edge sharpening with the set critical value, a sharpening-performed portion is not smoothly connected with a sharpening-not-performed portion, so that not only distortion is easily detected on an enlarged image, but also a ringing or artifact generated due to side effects during the edge sharpening still exists.

To solve this limitation, Korea patent application No. 10-2004-0094267 uses a finite impulse response (FIR) digital filter to obtain an enlarged image having a sharp edge without distortion. When this digital filter is used, an edge can be sharpened without a ringing or artifact.

However, in the case where the FIR digital filter proposed by the above-mentioned Korea patent application is used, image blurring is still generated when an image is enlarged from resolution of 1024×768 to resolution of 2048×1556 using an enlarging ratio of twice or more. Therefore, when the edge sharpening of an enlarge image is performed using the digital filter, a sharp image that is so sharp as to be used for high definition (HD) digital image media cannot be obtained.

As the size of an enlarged image increases, the blurring of the enlarged image gets serious even more. When the edge sharpening is performed to remove the blurring, a ringing or artifact appears conspicuous. Accordingly, the general edge sharpening methods proposed by the above-described Korea patent applications may not be suited for a HD digital image of 2 k or more.

SUMMARY OF THE INVENTION

Accordingly, the present invention is directed to an apparatus and a method for sharpening a blurred enlarged image, which substantially obviates one or more problems due to limitations and disadvantages of the related art.

It is an object of the present invention to provide an apparatus and a method for sharpening a blurred enlarged image configured to obtain a sharp image without a ringing or artifact by removing blurring of the image generated upon image enlargement using an edge-adaptive digital filter instead of using a digital filter for performing a general high-pass filtering proposed by related art methods to remove blurring of the image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for sharpening a blurred enlarged image, including a digital image output unit for outputting a digital image input through a digital image input unit, the apparatus including a digital image processing unit for calculating a primary edge direction of the digital image input through the digital image unit to perform enlarging and edge sharpening on the input digital image.

In another aspect of the present invention, there is provided a method for sharpening a blurred enlarged image, the method including the steps of: obtaining differentials corresponding to respective directions using an input digital filter and input intensity of an image, and obtaining a primary edge direction from the obtained differentials and a differential along the primary edge direction; obtaining a high-pass filtering value along the obtained primary edge direction; obtaining a general high-pass filtering value; obtaining deviation of the primary edge direction with respect to the differentials along the respective directions using the digital filter and the intensity of the image; and adaptively mixing the high-pass filtering value and the general high-pass filtering value according to deviation of the primary edge direction with respect to the differentials corresponding to the respective directions to obtain a final digital filtering value.

Therefore, according to the present invention, blurring is removed from the enlarged image without defects such as ringing or an artifact using an adaptive edge sharpening method, so that the enlarged image can be sharpened.

Also, according to the present invention, blurring is not generated even when an image is enlarged not only from resolution of quarter video graphic array (QVGA) (320×240) to resolution of VGA (640×480), but also from standard definition (SD) resolution to HD resolution.

Also, the present invention allows conversion from various image media produced for existing cable broadcasting or analog video to high definition digital image media of HD image quality. Accordingly, in case of digital image media such as character animation currently produced in consideration of HD image quality, the digital image media can be enlarged to have HD image quality without image quality reduction even when it is produced in SD image quality.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings:

FIG. 5 illustrates intensity of a digital input image in a 3 by 3 region according to an embodiment of the present invention;

FIGS. 6A to 6D illustrate digital filters, respectively, with respect to respective directions according to an embodiment of the present invention; and FIG. 7 illustrates a general high-pass digital filter used for the second high frequency band calculating unit of FIG. 1 according to the present invention.

DETAILED DESCRIPTION OF THE INVENTION

Figure 1:
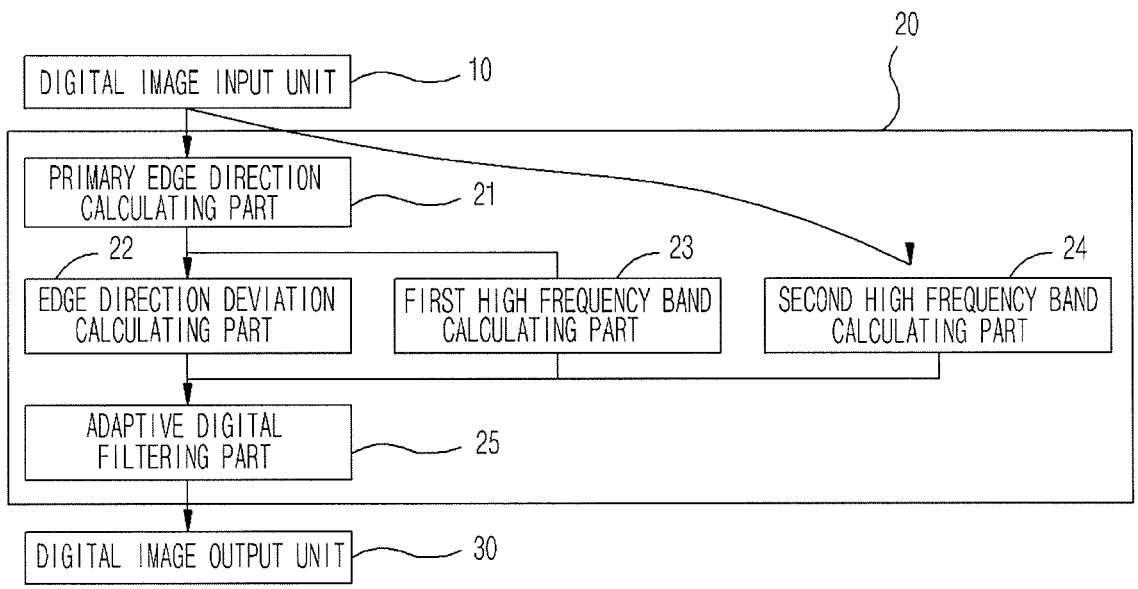
FIG. 1 illustrates a block diagram of an apparatus for sharpening a blurred enlarged image according to an embodiment of the present invention.

Reference will now be made in detail to the preferred embodiments of the present invention, examples of which are illustrated in the accompanying drawings.

Referring to FIG. 1 and FIGS. 4 to 7, an apparatus for sharpening a blurred enlarged image includes a digital image input unit 10, a digital image processing unit 20 for performing enlarging and edge sharpening on an input image, and a digital image output unit 30 for displaying a processed image to a user.

Examples of an image provided to the digital image input unit 10 include a digital image obtained by a charge coupled device (CCD) or a complementary metal oxide semiconductor (CMOS), and a digital image rendered using a tool such as a Mental Ray or a RenderMan.

The digital image processing unit 20 processes a digital image input through the digital image input unit 10, and includes a digital filter, a primary edge direction calculating part 21 for extracting intensity of an input image, a first high frequency band calculating part 23 for obtaining a high frequency band filtering value along a primary edge direction obtained by the primary edge direction calculating part 21, a second high frequency band calculating part 24 for obtaining a general high frequency band filtering value, an edge direction deviation calculating part 22 for obtaining deviation of an edge direction, and an adaptive digital filtering part 25.

Referring to FIGS. 4 to 6D, a differential di corresponding to each direction is obtained by the first high frequency band calculating part 23 using a digital filter and intensity of an image input through the edge direction deviation calculating part 22 through Equation 1. Also, as illustrated in FIG. 5, differentials obtained along respective directions 0°, 45°, 90°, and 135° are set as d1, d2, d3, and d4, and a primary edge direction and a differential thereof can be calculating using Equation 2. Here, in Equation 1, h (0,0) is a filtering value at a corresponding coordinate (0,0), and Y (0,0) is an intensity value at a corresponding coordinate (0,0). Also, the first high frequency band calculating part 23 determines a differential having a largest value of differentials of respective directions calculated by the first high frequency band calculating part 23 as the primary edge direction. A differential along the primary edge direction is given by Equation 2. Equations 1 and 2 are expressed in the following.

$$d_i = \begin{vmatrix} (h(0,0)*Y(0,0) + h(0,1)*Y(0,1) + h(0,2)*Y(0,2) + \\ h(1,0)*Y(1,0) + h(1,1)*Y(1,1) + h(1,2)*Y(1,2) + \\ h(2,0)*Y(2,0) + h(2,1)*Y(2,1) + h(2,2)*Y(2,2))/6 \end{vmatrix}$$ Equation 1

$$i = 1, 2, 3, 4$$

$$d = \max(d_1, d_2, d_3, d_4)$$ Equation 2

Here, FIG. 6A illustrates a digital filter applied at 0°, FIG. 6B illustrates a digital filter applied at 90°, FIG. 6C illustrates a digital filter applied at 135°, FIG. 6D illustrates a digital filter applied at 45°. Therefore, application of FIG. 4 to FIGS. 6A to 6D can be descried in the following.

Figures 3, 4:
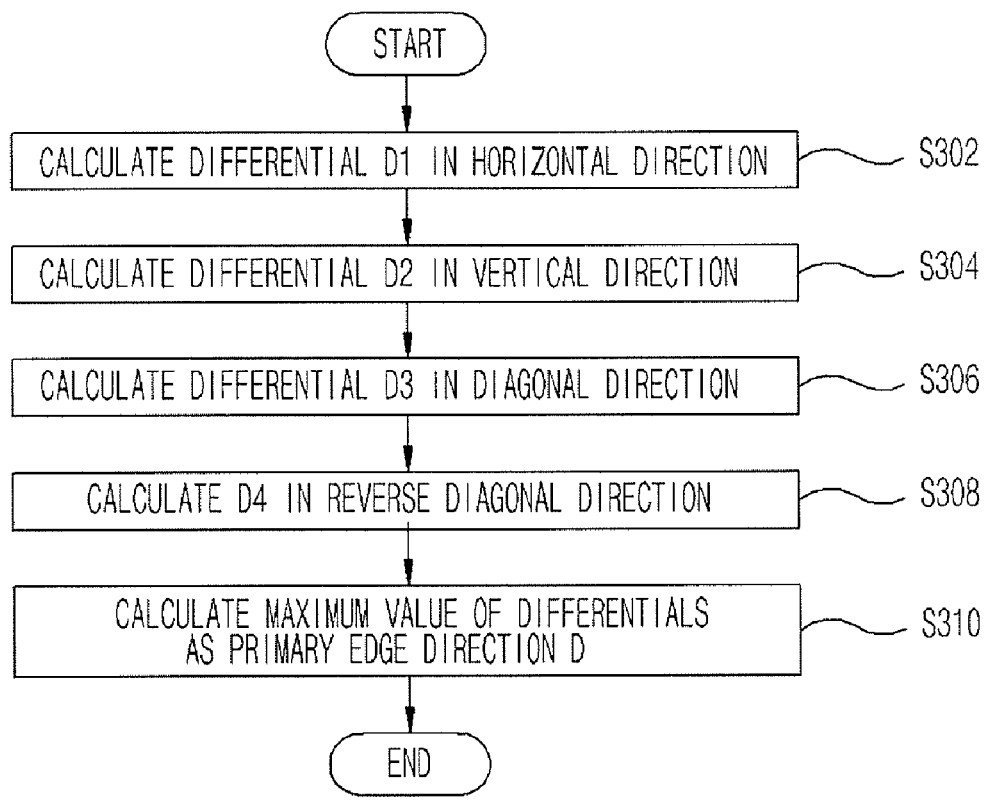
FIG. 3 illustrates a process for calculating a primary edge direction according to FIG. 2.
FIG. 4 illustrates an arbitrary digital filter including a 3 by 3 mask according to an embodiment of the present invention.

First, when FIG. 4 is applied to the digital filter of FIG. 6A illustrating an edge value at 0°, output values of the digital filter are given by h (0,0)=1, h (0,1)=1, h (0,2)=1, h (1,0)=0, h (1,1)=0, h (1,2)=0, h (2,0)=−1, h (2,1)=−1, h (2,2)=−1.

When FIG. 4 is applied to the digital filter of FIG. 6B illustrating an edge value at 90°, output values of the digital filter are given by h (0,0)=1, h (0,1)=0, h (0,2)=−1, h (1,0)=1, h (1,1)=0, h (1,2)=−1, h (2,0)=1, h (2,1)=0, h (2,2)=−1.

When FIG. 4 is applied to the digital filter of FIG. 6C illustrating an edge value at 135°, output values of the digital filter are given by h (0,0)=1, h (0,1)=1, h (0,2)=0, h (1,0)=1, h (1,1)=0, h (1,2)=−1, h (2,0)=0, h (2,1)=−1, h (2,2)=−1.

When FIG. 4 is applied to the digital filter of FIG. 6D illustrating an edge value at 45°, output values of the digital filter are given by h (0,0)=0, h (0,1)=1, h (0,2)=1, h (1,0)=−1, h (1,1)=0, h (1,2)=1, h (2,0)=−1, h (2,1)=−1, h (2,2)=0.

Also, the first high frequency band calculating unit 23 obtains a differential having a largest value of differentials of respective directions calculated by the first high frequency band calculating part 23 as in Equation 2, and can express a high frequency band filtering value h1 calculated by the first high frequency band calculating part 23 in terms of deviation of the primary edge direction and an intensity value at a center point (1,1) of a line coordinate at a desired point using the obtained differential having the largest value as in Equation 3.

$$h1 = |d/2 - Y(1,1)|$$ Equation 3

Also, the second high frequency band calculating part 24 receives a digital image from the digital image input unit 10 to obtain a general high frequency band filtering value. The general high frequency band filtering value h2 obtained by the second high frequency band calculating part 24 can be expressed using Equation 4. At this point, the digital filter used is illustrated in FIG. 7.

$$h2 = \begin{vmatrix} h(0,0)*Y(0,0) + h(0,1)*Y(0,1) + h(0,2)*Y(0,2) + \\ h(1,0)*Y(1,0) + h(1,1)*Y(1,1) + h(1,2)*Y(1,2) + \\ h(2,0)*Y(2,0) + h(2,1)*Y(2,1) + h(2,2)*Y(2,2) \end{vmatrix}$$ Equation 4

When the processes of Equation 3 performed by the first high frequency band calculating part 23 and Equation performed by the second high frequency band calculating part 24 are completed, the edge direction deviation calculating part 22 calculates dispersion dw(=VAR) of differentials D corresponding to respective directions using the digital filter obtained by the primary edge direction calculating part 21 and intensity of an image. The dispersion calculated by the edge direction deviation calculating part 22 is obtained by the process expressed by Equation 5, which is given by:

$$dw = VAR[D] = E[D^2] - E[D]^2,$$

$$D = (d_1, d_2, d_3, d_4) \quad \text{Equation 5}$$

where E is an expectation value, i.e., an average.

Referring to FIG. 6, the adaptive digital filtering part 25 adaptively mixes a filtering value filtered by the first high frequency band calculating part 23 and a value filtered by the second high frequency band calculating part 24 according to primary edge direction deviation calculated by the edge direction deviation calculating part 22 using Equation 5 to obtain a final digital filtering value.

A process for obtaining an intensity value and a parameter required for adaptively mixing the filtering value filtered by the first high frequency band calculating part 23 and the value filtered by the second high frequency band calculating part 24 according to the primary edge direction deviation can be expressed by Equation 6, which is given by:

$$Y_{out}(i,j) = (1-a)*h1 + a*h2$$

$$a = 1/(2*\exp(k*dw) - 1) \quad \text{Equation 6}$$

A primary edge direction is obtained, and a high frequency band filtering value along the primary edge direction is mixed with a general high frequency band filtering value with consideration of deviation of the primary edge direction, so that intensity Yout (i,j) of an image output at each point, and 'a', which is a coefficient used for adaptive filtering, are obtained as expressed in Equation 6. Here, 'a' is a parameter for controlling an inner product of a high frequency band filtering value h1 of a differential of a direction having a largest value, and a general high frequency band filtering value h2. Actually, 'a' is a value for determining a ratio as to whether to primarily use the high frequency filtering value h1 having directionality of FIG. 5 or the general Laplacian high frequency filtering value h2 of FIG. 6 depending on an area of an input image. An edge adaptive sharpening method is realized using this ratio. Meanwhile, k is an arbitrary constant. Any value can be used but k is set to a value of about 0.0001 in the present invention.

Figure 2:
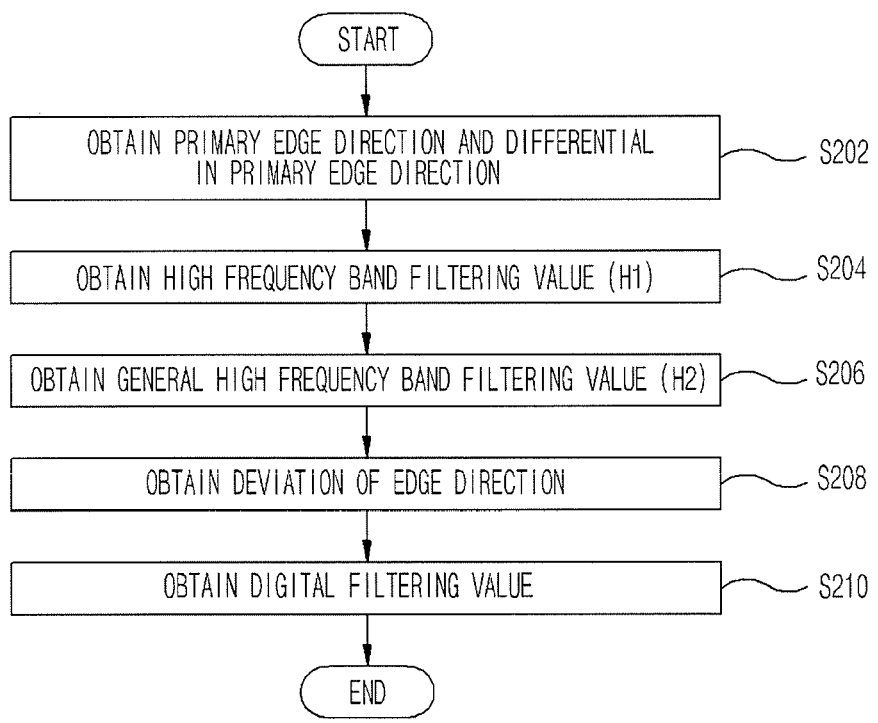
FIG. 2 illustrates a method for sharpening a blurred enlarged image according to an embodiment of the present invention.

FIG. 2 illustrates a method for sharpening a blurred enlarged image according to an embodiment of the present invention.

Referring to FIG. 2, the first high frequency band calculating part 23 obtains differentials di, D corresponding to respective directions using a digital filter and intensity of an image input through the primary edge direction calculating part 21, and obtains a primary edge direction d and a differential along the primary edge direction (S202). At this point, the edge directions include 0°, 45°, 90°, and 135°, and can be obtained using Equation 2.

The first high frequency band calculating part 23 obtains the high frequency band filtering value h1 using Equation 3 along the primary edge direction d obtained in the step S202 (S204).

Also, the second high frequency band calculating part 24 obtains the general high frequency band filtering value h2 (S206).

The edge direction deviation calculating part 22 obtains deviation dw of the primary edge direction with respect to differentials D in respective directions using a digital filter and intensity of an image input through the primary edge direction calculating part 21 (S208).

The high frequency band filtering value h1 obtained in step S204 is adaptively mixed with the general high frequency band filtering value h2 obtained in step S206 according to the deviation dw of the primary edge direction with respect to the differentials D corresponding to the respective directions obtained in step S208, so that a final digital filtering value is obtained (S210). At this point, the value 'a' obtained using Equation 6 is used to adaptively mix the filtering values.

FIG. 3 illustrates a process for calculating a primary edge direction according to FIG. 2 of the preset invention.

A differential d1 in a horizontal direction is calculated (S302). Here, the differential d1 in the horizontal direction can be represented by 0°, and corresponds to FIG. 6A.

A differential d2 in a vertical direction is calculated (S304). Here, the differential d2 in the vertical direction can be represented by 90°, and corresponds to FIG. 6B.

A differential d3 in a diagonal direction is calculated (S306). Here, the differential d3 in the diagonal direction can be represented by 135°, and corresponds to FIG. 6C.

A differential d4 in a reverse diagonal direction is calculated (S308). Here, the differential d4 in the reverse diagonal direction can be represented by 45°, and corresponds to FIG. 6D.

The direction of a differential of differentials corresponding to respective directions, that has a maximum value is determined as the primary edge direction (S310).

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for sharpening a blurred enlarged image, including a digital image output unit for outputting a digital image input through a digital image input unit, the apparatus comprising a digital image processing unit for calculating a primary edge direction of the digital image input through the digital image unit to perform enlarging and edge sharpening on the input digital image, wherein the digital image processing unit comprises:
a primary edge direction calculating part comprising a digital filter, and extracting input intensity of an image;
a first high frequency band calculating part for selecting one of 0°, 90°, 135°, and 45° as a primary edge direction, and obtaining a differential of the primary edge direction to obtain a high frequency band filtering value corresponding to the primary edge direction;
a second high frequency band calculating part for obtaining a general high frequency band filtering value;
an adaptive digital filtering part for adaptively mixing the high frequency band filtering value filtered by the first high frequency band calculating part with the general high frequency band filtering value filtered by the second high frequency band calculating part according to deviation of an edge direction to obtain a digital filtering value.

2. The apparatus of claim 1, wherein the first high frequency band calculating part obtains deviations of respective directions using the following Equation:

$$d_i = \begin{vmatrix} (h(0,0)*Y(0,0) + h(0,1)*Y(0,1) + h(0,2)*Y(0,2) + \\ h(1,0)*Y(1,0) + h(1,1)*Y(1,1) + h(1,2)*Y(1,2) + \\ h(2,0)*Y(2,0) + h(2,1)*Y(2,1) + h(2,2)*Y(2,2))/6 \end{vmatrix}$$

$$i = 1, 2, 3, 4$$

where di is the deviations of the respective directions, h(i,j) is a filter at a corresponding coordinate, and Y(i,j) is intensity at a corresponding coordinate.

3. The apparatus of claim 1 or 2, wherein the first high frequency band calculating part determines a direction having a largest differential of differentials of respective directions that are obtained by the first high frequency band calculating part as the primary edge direction.

4. The apparatus of claim 3, wherein the first high frequency band calculating part uses a filter shown in the following as a digital filter applied to 0°:

|       | h( , 0) | h( , 1) | h( , 2) |
|-------|---------|---------|---------|
| h(0, ) | 1      | 1       | 1       |
| h(1, ) | 0      | 0       | 0       |
| h(2, ) | -1     | -1      | -1.     |

5. The apparatus of claim 3, wherein the first high frequency band calculating part uses a filter shown in the following as a digital filter applied to 90°:

|       | h( , 0) | h( , 1) | h( , 2) |
|-------|---------|---------|---------|
| h(0, ) | 1      | 0       | -1      |
| h(1, ) | 1      | 0       | -1      |
| h(2, ) | 1      | 0       | -1.     |

6. The apparatus of claim 3, wherein the first high frequency band calculating part uses a filter shown in the following as a digital filter applied to 135°:

|       | h( , 0) | h( , 1) | h( , 2) |
|-------|---------|---------|---------|
| h(0, ) | 1      | 1       | 0       |
| h(1, ) | 1      | 0       | -1      |
| h(2, ) | 0      | -1      | -1.     |

7. The apparatus of claim 3, wherein the first high frequency band calculating part uses a filter shown in the following as a digital filter applied to 45°:

|       | h( , 0) | h( , 1) | h( , 2) |
|-------|---------|---------|---------|
| h(0, ) | 0      | 1       | 1       |
| h(1, ) | -1     | 0       | 1       |
| h(2, ) | -1     | -1      | 0.      |

8. The apparatus of claim 1, wherein the first high frequency band calculating part obtains the high frequency band filtering value using a differential of the primary edge direction and intensity at coordinates of a center point of a filter through the following Equation:

$$h1 = |d/2 - Y(1,1)|,$$

where h1 is the high frequency band filtering value.

9. The apparatus of claim 1, wherein the second high frequency band calculating part obtains the general high frequency band filtering value using the following Equation:

$$h2 = \begin{vmatrix} h(0,0)*Y(0,0) + h(0,1)*Y(0,1) + h(0,2)*Y(0,2) + \\ h(1,0)*Y(1,0) + h(1,1)*Y(1,1) + h(1,2)*Y(1,2) + \\ h(2,0)*Y(2,0) + h(2,1)*Y(2,1) + h(2,2)*Y(2,2) \end{vmatrix}$$

where h2 is the general high frequency band filtering value, h(i,j) is a filter at a corresponding coordinate, and Y(i,j) is intensity at a corresponding coordinate.

10. The apparatus of claim 1, wherein the edge direction deviation calculating part obtains dispersion using the following Equation:

$$dw = \text{VAR}[D] = E[D^2] - E[D]^2,$$

$$D = (d_1, d_2, d_3, d_4)$$

where dw=VAR is the dispersion, and E is an average.

11. The apparatus of claim 1, wherein the adaptive digital filtering part obtains 'a', which is a coefficient used for an adaptive filtering operation represented by Equation of a=1/(2*exp(k*dw)−1), and performs an filtering operation using the coefficient a by controlling an inner product of a high frequency band filtering value in a direction having a largest differential and the general high frequency band filtering value, where a is a parameter for controlling the inner product of the high frequency band filtering value of a differential of a direction having a largest value, and the general high frequency band filtering value, k is a constant, and dw is dispersion.

12. A method for sharpening a blurred enlarged image, the method comprising the steps of:
    obtaining differentials corresponding to respective directions using an input digital filter and input intensity of an image, and obtaining a primary edge direction from the obtained differentials and a differential along the primary edge direction;
    obtaining a high-pass filtering value along the obtained primary edge direction;
    obtaining a general high-pass filtering value;
    obtaining deviation of the primary edge direction with respect to the differentials along the respective directions using the digital filter and the intensity of the image; and
    adaptively mixing the high-pass filtering value and the general high-pass filtering value according to deviation of the primary edge direction with respect to the differentials corresponding to the respective directions to obtain a final digital filtering value.

13. The method of claim 12, wherein a direction having a largest differential of differentials of respective directions as the primary edge direction.

14. The method of claim 13, wherein 'a', which is a coefficient used for an adaptive filtering operation represented by Equation of a=1/(2*exp(k*dw)−1) is obtained for the step of adaptively mixing, and an filtering operation is performed using the coefficient a by controlling an inner product of a high frequency band filtering value in a direction having a largest differential and the general high frequency band filtering value, where a is a parameter for controlling the inner product of the high frequency band filtering value of a differential of a direction having a largest value, and the general high frequency band filtering value, k is a constant, and dw is dispersion.

15. The method of claim 13, wherein the step of obtaining the primary edge direction comprises the steps of:
- calculating a differential in a horizontal direction;
- calculating a differential in a vertical direction;
- calculating a differential in a diagonal direction;
- calculating a differential in a reverse diagonal direction; and
- determining a direction of a differential having a maximum value of differentials of respective directions as the primary edge direction.

16. A non-transitory computer-readable recording medium having a program recorded thereon, the program performing the steps of the method according to one of claims 12 to 15.

* * * * *